United States Patent
Schaaf et al.

(10) Patent No.: US 9,405,741 B1
(45) Date of Patent: Aug. 2, 2016

(54) CONTROLLING OFFENSIVE CONTENT IN OUTPUT

(71) Applicant: Amazon Technologies, Inc., Reno, NV (US)

(72) Inventors: Thomas Schaaf, Pittsburgh, PA (US); Sumedha Arvind Kshirsagar, Seattle, WA (US); Roger Alix-Gaudreau, Derry, NH (US); Remus Razvan Mois, Eastern Pomerania (PL); Rafal Kuklinski, Pomorskie (PL); Derek Christopher Murman, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 187 days.

(21) Appl. No.: 14/223,648

(22) Filed: Mar. 24, 2014

(51) Int. Cl.
*G06F 17/27* (2006.01)
*G10L 15/08* (2006.01)

(52) U.S. Cl.
CPC .............. *G06F 17/27* (2013.01); *G10L 15/08* (2013.01)

(58) Field of Classification Search
None
See application file for complete search history.

(56) References Cited

U.S. PATENT DOCUMENTS

| | | | | |
|---|---|---|---|---|
| 7,139,031 B1* | 11/2006 | Bray | ................ | H04N 5/23241 348/468 |
| 9,002,703 B1* | 4/2015 | Crosley | ................ | G06Q 10/101 704/206 |
| 2004/0193426 A1* | 9/2004 | Maddux | ................ | G06Q 30/02 704/275 |
| 2006/0095262 A1* | 5/2006 | Danieli | ................ | G10L 15/08 704/251 |
| 2007/0294077 A1* | 12/2007 | Narayanan | ............ | G06F 17/277 704/2 |
| 2012/0201362 A1* | 8/2012 | Crossan | ................ | G10L 15/26 379/88.01 |
| 2013/0018656 A1* | 1/2013 | White | ................ | G10L 15/30 704/235 |
| 2014/0052452 A1* | 2/2014 | Koivuniemi | ..... | H04N 21/42203 704/275 |
| 2014/0108009 A1* | 4/2014 | Chang | ................ | H04N 21/2543 704/231 |
| 2014/0196092 A1* | 7/2014 | Chung | ................ | G10L 15/26 725/53 |
| 2014/0372876 A1* | 12/2014 | Bliss | ................ | H04N 21/4532 715/253 |
| 2015/0095014 A1* | 4/2015 | Marimuthu | ......... | G06F 17/2735 704/9 |
| 2015/0221299 A1* | 8/2015 | Matula | ................ | G10L 15/08 704/249 |

* cited by examiner

*Primary Examiner* — Douglas Godbold
(74) *Attorney, Agent, or Firm* — Knobbe Martens Olson & Bear LLP

(57) ABSTRACT

Features are disclosed for recognizing inappropriate content in an output. The offensive content may be generated as a result of a speech processing error. A system may identify the inappropriate elements of a generated output and select among different appropriate alternatives. The system may be adjusted based on certain user characteristics. The system may be localized based on language and cultural features. The system may modify the generated output based on characteristics such as the tolerance threshold of known persons in the proximity of the system. The tolerance threshold may further be used to personalize and modify available content. Models used by the system may be further trained using input from a user.

23 Claims, 4 Drawing Sheets

CONTROLLING OFFENSIVE CONTENT IN OUTPUT

BACKGROUND

Spoken language processing systems include various modules and components for receiving speech input from a user, determining what the user said, and responding to what the user said. In some implementations, a spoken language processing system includes an automatic speech recognition ("ASR") module that receives audio input of a user utterance and generates one or more likely transcriptions of the utterance. Spoken language processing systems may also include a natural language understanding ("NLU") module that receives textual input, such as a transcription of a user utterance, and determines the meaning of the text in a way that can be acted upon, such as by a computer application. Spoken language processing systems may also include an output generator ("OG") that manages interaction of a user with the system, prompts the user for information that may be required to execute various applications or perform various functions, generates responses, provides outputs corresponding to the responses or other user input to the user, etc. Mistakes in speech processing can lead to erroneous responses.

Using a client device with an output generator may facilitate the playback and/or display of content, such as audio books, electronic books (also referred to as e-books), songs, videos, television programs, computer and video games, multi-media content, and the like. For example, a user of a client device may make a spoken utterance requesting, "Play 'Fly Me to the Moon.'" Audio of the spoken command can be transcribed by the ASR module. The NLU module can determine the user's intent (e.g., that the user wants a certain song played) from the transcription. The output generator may then generate a response to the user's question, including initiating various applications or performance of various functions.

The generated response can include a user interface element. The user interface element can include the name of a content item. For example, the name of a content item can be a song title, artist name, movie title, etc. The user interface element may be in the format of a media output, such as audio output, spoken output, written output, visual output, etc. The output generator may utilize the user interface element to prompt the user for additional information or for confirmation of the correct output. For example, when the user would like a song played, the output generator may prompt the user for confirmation of the correct song (e.g., User: "Play me 'Fly Me to the Moon.'" OG: "You'd like to play 'Fly Me to the Moon,' correct?"), or present the user with a user interface element as part of the generated response (e.g., User: "Play me 'Fly Me to the Moon.'" OG: "Now playing 'Fly Me to the Moon.'" Client device begins playing "Fly Me to the Moon."). While output generators may be used to manage interactions between users and spoken language processing systems, these output generators can still encounter difficulties when trying to resolve spoken language processing system recognition errors.

BRIEF DESCRIPTION OF DRAWINGS

Embodiments of various inventive features will now be described with reference to the following drawings. Throughout the drawings, reference numbers may be reused to indicate correspondence between referenced elements. The drawings are provided to illustrate example embodiments described herein and are not intended to limit the scope of the disclosure.

DETAILED DESCRIPTION

Introduction

Figure 1:
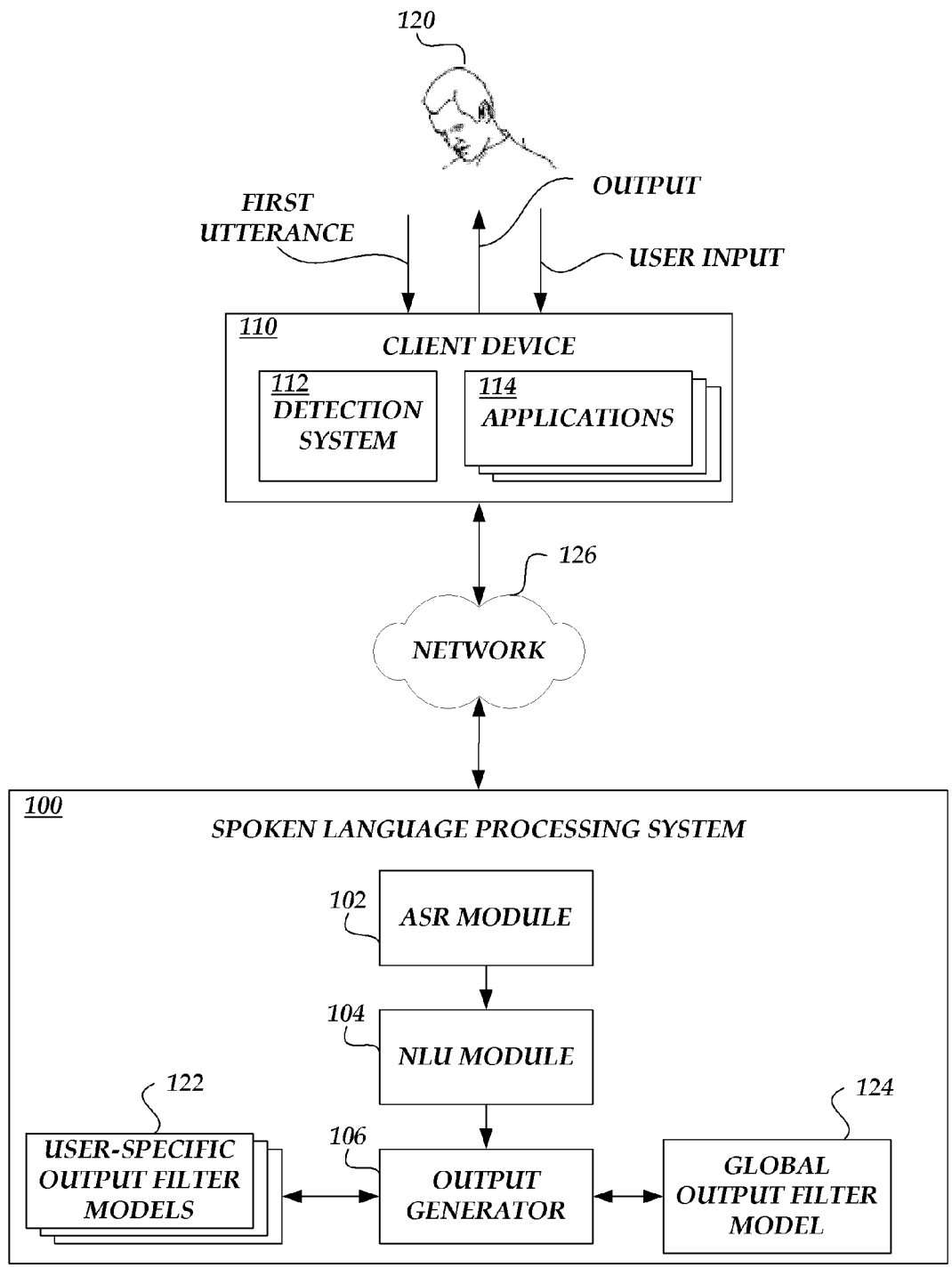
FIG. 1 is a block diagram of an illustrative network environment in which a spoken language processing system may be implemented in conjunction with output filter models and a client device.

A user may interact with a computing device in various ways. When the device detects a device-directed utterance, the utterance can be processed by a spoken language processing system to recognize the speech. The spoken language processing system may then initiate other processing responsive to the spoken query or command. The spoken language processing system may occasionally incorrectly identify a user utterance. The user may also request something from the device but may be presented with unexpected, though accurate, results. Such recognition errors may lead to output that a user finds inappropriate or offensive, e.g., that falls above the user's tolerance threshold. The spoken language processing system may control generated responses before presenting the output corresponding to the response to the user so as to provide appropriate content based on user tolerance level. The responses may be modified, filtered, have offensive portions replaced with new elements, etc. Such modifications can improve the user experience.

The spoken language processing system may utilize various models in its processing. Some models may be utilized to recognize speech, such as an acoustic model and a language model. The spoken language processing system may contain an ASR module, which utilizes the acoustic model and the language model. The acoustic model is used in processing features of audio data to generate hypotheses regarding which words or subword units (e.g., phonemes) correspond to an utterance captured in the audio data. The language model is used to determine which of the hypotheses generated using the acoustic model is the most likely transcription of the utterance. As another example, an NLU module may include models for named entity recognition, intent classification, etc. Numerous other models may be used to further improve processing results and enhance the user experience.

Spoken language processing systems may use output generators to manage interactions with users and generate responses to user commands, utterances, or queries. An output generator's response may include executing a command, requesting more information, or providing the requested information to the user. The response may include a user interface element and/or execution of a command or application. The user interface element may contain the name of a content item. The name of the content item can be, e.g., a song title, movie title, artist name, album name, etc. For example, the output generator may generate a response stating, "Now playing 'Fly Me to the Moon,'" or "Now playing the requested music." The name of the content item is the song title "Fly Me to the Moon." This generated response may be presented to the user as output before or while the client device plays the requested song for the user.

The output generator may engage in an interaction between a user and the spoken language processing system. Such an interaction may be referred to as a dialog. The dialog may involve one or more user utterances associated with a particular task or query. The output generator may receive and/or store information related to the dialog. This information can include the user's response to the output. The output generator may utilize global and/or user-specific output filter models to determine which types of content are appropriate in a response. The output filter model can include, for example, a list of profane words. In another example, the output filter model can include a list of profane words along with a profanity score for each word. These output filter models may be used to determine what response a given user would find offensive. The output generator may then modify or alter the content so as to avoid offending the user. The appropriateness of the content may vary depending on the context of the situation. For example, a user may ask the client device to add "chicken breasts" to a grocery shopping list. The output generator may use output filter models to determine that while the term "breasts" is ordinarily an offensive term to the user, the term is not offensive in the context of a grocery shopping list. As a result, the generated response is likely not the product of a speech processing error. The client device can then execute a command from the output generator to add "chicken breasts" to the grocery shopping list application and present the result to the user. In another example, a user may ask the client device to play "Some Beach," referring to the song by Blake Shelton. The spoken language processing system may process the user query and incorrectly identify the user to be asking for the song "Hair of the Dog (Son of a B*tch)" by Nazareth. The output filter models may be used by the output generator to determine that this song title would be offensive to the user. The output generator may then ask the user, "Did you mean the song by Nazareth?" This allow for user verification of the correct response without offending the user.

The parameters of these models can be set in a process referred to as "training." Output filter models can be trained using training data. This training data may be acquired, for example, from statistical data, surveys, user data, etc. For global models, this data may indicate what a typical user finds offensive. Such training data can be acquired from a plurality of users. The model parameters can be updated as more information is received. This can increase the accuracy of the trained models. An output generator can utilize a global output filter model when the spoken language processing system has not determined what a specific speaker may find offensive. The output generator may alternatively or additionally utilize one or more user-specific output filter models. The user-specific output filter models can be based on identified user characteristics, such as age, gender, cultural background, language, etc. A user-specific output filter model may be based on a specific user, such as the owner of a client device. Output filter models may be further trained as a given user provides user input to the client device.

A spoken language processing system may assess whether a response requires modification. This modification can be due to offensive content in the response. The response may include execution of a command or media content and/or a user interface element. For example, the spoken language processing system may detect a profanity in a word, phrase, or sentence generated by the output generator. The spoken language processing system can determine whether the response is offensive. For example, the spoken language processing system may use output filter models to grade the generated responses and select among different alternatives. The generated responses may be scored using many different methods, such as grading, classification, etc. For example, the scoring may be rule-based, with offensiveness levels previously assigned by experts. In another example, the spoken language processing system may classify different words or phrases. Classifiers may be trained using labels from human annotations. In yet another example, the scoring criteria can be derived from sources such as consumer reviews flagged by other consumers as inappropriate. The scoring and/or classification may vary depending on the user. Words or phrases offensive in one culture but not another, or offensive to young children but not adults, may be categorized depending on these variables. For example, the words "bloody," "bollocks," "shag," and "slag" may be mildly to moderately offensive to British users. However, such words and/or phrases would not be offensive to most American users. An output filter model geared towards American users would likely not filter such words from the response as it would not exceed the tolerance threshold of the American users, while an output filter model geared towards British users may filter such words.

The spoken language processing system can determine some user characteristic. The user characteristic can include, for example, the user age, gender, culture, religion, etc. The user characteristic can correspond to a threshold. The threshold can be a tolerance threshold. The threshold can be user-specific. The spoken language processing system can, by analyzing speech input data, estimate the age of the user based on the user's speech. For example, the spoken language processing system may be able to determine characteristics about the user based on vocal tract length features. In some embodiments, the system can identify a specific user using a speaker identification system. The maximum appropriate scores may be pre-determined based on the user's threshold. The spoken language processing system can determine whether to use a user-specific output filter model based on information about the user, user preferences, or a history of user interactions.

The generated response may be scored before being presented to the user as an output. The output can include one or more of audio, text, or visual data. The spoken language processing system can grade the response. The response can include commands to execute playing media content. The content may be files presented to the user, such as movies, songs, albums, audio books, etc. The response may include the user interface element presented to the user as part of the output. The response can include the name of a content item, such as a movie title, song title, album title, audio book title, item added to a list, etc. Different elements of the response may have different offensiveness scores. For example, the movie "Bull Durham" can be rated "R" and is thus potentially offensive. An output generator may not include in its response a command for the client device to execute playing the movie as playing the movie may offend the user. However, the related user interface element presented to the user, such as "Now playing 'Bull Durham,'" would not be offensive to a user, though the movie itself might be. In another example, the song "Fuck You," by Cee Lo Green may be offensive to a user due to profanities. The user interface element presented to a user, such as "Now playing 'Fuck You,' by Cee Lo Green," may be offensive as well because the name of the content item, here, the song title, contains a profanity. If the response is given an offensiveness score higher than a given user's tolerance threshold, the content may be modified, e.g., filtered, replaced with non-offensive content, etc., before being presented to the user as output. If the spoken language processing system detects multiple users or persons within proximity of the client device, e.g., children in the same room as the user, the system may set acceptable levels based on the person present who has the lowest threshold. For example, if the spoken language processing system is aware that a young child is in the same room as the client device, and the child's parent is interacting with the client device, the spoken language system may modify the generated response so as not to present the child with offensive content. These default values can be overwritten by the user if desired.

The output generator can make a variety of determinations as to when and how to modify a generated response. The output generator may deliver unmodified output corresponding to the response to the user, such as commanding the client device to play the audio song file that the spoken language processing system has determined that the user likely requested. The client device may deliver some warning to the user before delivering the requested content, such as "This song contains graphic language." The client device may query the user for confirmation before delivering potentially offensive output, such as asking the user "Did you want to play this song by Cee Lo Green?" The output generator may generate a command such that the client device does not present the user with the requested content until the spoken language processing system receives confirmation from the user that the response is correct. The output generator may deliver a modified user interface element and/or generate commands to filter available content not suitable for certain users, such as movies, songs, games, books, etc. For example, the output generator may determine that the client device should not present a requested episode of "South Park" to the user if the spoken language processing system has determined that the user is a seven-year-old.

Depending on the acceptable profanity, level, many possible modifications may be made to the user interface element. For example, the user interface element may be presented to the user as part of the output without any filtering, such as generating a user interface element stating "Now playing 'Fuck You' by Cee Lo Green." The user interface element may have offensive content filtered from the name of the content item, such as "Now playing 'F*ck You' by Cee Lo Green," or "Now playing 'Forget You' by Cee Lo Green." The output generator may replace part of the offending word or phrase in the output with an alternate sound, such as a "bleep," or mute the word or phrase altogether. The output generator may adjust the output so that the offensive content is avoided completely, such as "Now playing the requested song." The user may then listen to his requested song, or, if the spoken language processing system has made a recognition error, deliver some negative user input to the client device before the offensive content is delivered to the user. For example, the client device may present the user with the output corresponding to the response, "Now playing 'Forget You' by Cee Lo Green." The user may then say, "No, not that song," before the song starts playing. The spoken language processing system can then generate a new response based on the next most likely spoken language processing result, and the user can be presented with appropriate content.

Aspects of the embodiments described in the present disclosure may describe, for the purpose of illustration, a spoken language processing system containing an output generator that filters profanity from a response comprising user interface element and/or commands to execute applications playing media content files. However, the systems and techniques described herein may be used in any number of processes or applications for controlling content. The content can be offensive content such as graphic language, violence, sexual content, etc. The system may be, for example, a language processing system rather than a spoken language processing system. The user may provide the system with user input such as speech input. The user may additionally or instead provide the user with textual input, physical gestures, non-verbal user input, etc. In addition, a computer system may receive input information from the surrounding environment. Various aspects of the disclosure will now be described with regard to certain examples and embodiments, which are intended to illustrate but not limit the disclosure.

Spoken Language Processing System Containing an Output Generator

With reference to an illustrative example of utilizing a spoken language processing system, a user may direct utterances to a client device. The utterances may include spoken commands. The client device may be configured to perform speech processing on the utterances. The client device may perform various functions responsive to the utterances. For example, the client device may execute commands or applications, provide user interface elements to the user, and the like. The interactions between the user and client device may be referred to as a dialog.

FIG. 1 illustrates a spoken language processing system 100, a client device 110, a user 120, output filter models 122, 124, output generator 106, and various interactions and data flows that may occur during a series of dialogs. It will be appreciated by those of skill in the relevant art that many of the devices, components and data flows that may be included or used in such conversations are not shown in order to simplify the figures and following discussion.

Illustratively, a user 120 may initiate a dialog with a client device 110, as shown in FIG. 1. The dialog may include a first utterance from the user 120. The output generator 106 may generate a response to the user 120. The response may include an answer and/or prompts for information relevant to determining the appropriate output. The client device 110 may deliver part or all of a generated output corresponding to the response to the user 120. For example, the user may say, "Play me 'Fly Me to the Moon.'" The output generator 106 may generate an output corresponding to its generated response that it delivers to the client device 110. The client device 110 may deliver the output to the user 120. The response can include a user interface element. The user interface element can include the name of a content item. The output can include stating or displaying "Now playing 'Fly Me to the Moon,' by Frank Sinatra," as well as other requested media content, e.g., commanding the client device to start playing the song "Fly Me to the Moon." In the above example, the response includes the name of the content item corresponding to the song title as well as the name of the content item corresponding to the artist.

The user 120 may encounter various scenarios that lead to offensive content being presented in a generated response. In one scenario, the user 120 may request music by an artist or album. One of the song titles in the album may contain an expletive. Because the user 120 did not directly request the song, the user may be surprised and/or offended when the client device 110 announces the title as part of the output. The user 120 may, in another scenario, directly request music by giving a specific song title which contains expletives. The user 120 may expect to hear the song title as is. In another scenario, the user 120 may request a certain song or artist, but the spoken language processing system 100 may misidentify the user request as a request including profanity.

If the spoken language processing system 100 is not confident in the request of the use 120, it may prompt the user 120 to confirm the choice. This may involve repeating a song title back to the user 120. The spoken language processing system may, for example, be repeating a title or name in the music collection of the user 120. The title may be a speech processing error, but the user 120 may not be offended as the user is already familiar with the title. The user 120 may alternatively request to find a song. The spoken language processing system 100 may not be confident in the result, but may have matched the request to a known title. The response may include unexpected expletives because the user 120 may be presented with content that the user 120 was not aware of. For example, the user 120 may ask to hear music by Pink, but be surprised by the song "Fuckin' Perfect," as the user 120 may not have known about that song. The spoken language processing system 100 may find no match for the inquiry of the user 120, and may repeat the identified user request back to the user 120. These examples are presented as illustrative, though not limiting, examples describing when a user 120 may encounter offensive content from the spoken language processing system 100.

The spoken language processing system 100 can be a network-accessible system in communication with the client device 110 via a communication network 126, such as a cellular telephone network or the Internet. A user 120 may use the client device 110 to submit utterances, including queries, receive information, and initiate various processes, either on the client device 110 or the spoken language processing system 100. For example, the user 120 can issue spoken commands to the client device 110 in order to listen to music, watch movies, listen to audio books, ask for directions, ask for weather information, add items to a shopping list, etc. The user 120 can submit queries related to the surrounding environment, including media content played by the client device 110.

The client device 110 may correspond to a wide variety of electronic devices. In some embodiments, the client device 110 may be a computing device that includes one or more processors and a memory which may contain software applications executed by the processor(s). Illustratively, the client device 110 may be a personal computing device, laptop computing device, hand-held computing device, terminal computing device, mobile device (e.g., mobile phone or tablet computing device), wearable device configured with network access and program execution capabilities (e.g., "smart eyewear" or "smart watch"), wireless device, electronic reader, media player, gaming console, set-top box, television configured with network access and program execution capabilities (e.g., "smart TV"), or various other electronic devices and appliances.

The user 120 may direct some utterance at the client device 110. The client device 110 may contain a detection system 112. The detection system 112 may identify any device-directed utterance. The detection system 112 may additionally detect other users in proximity of the device. The user 120 may direct the client device 110 in at least the following two ways. In the first way, the utterance may be prefaced by an activation word. In the utterance, "Phone, play me 'Fly Me to the Moon,'" the word "phone" may be the activation word. The activation word may be highly constrained. The activation word may be some pre-identified word, definition, or phrase. The user 120 may have defined a word or phrase as the desired activation word. In the second way, the utterance may not be prefaced by an activation word. In the utterance, "Play 'Fly Me to the Moon,'" the user 120 may expect the client device 110 to respond to the query even though the user 120 did not preface the query with an activation word.

The client device 110 may communicate with the spoken language processing system 100 via a communication network 126. The communication network 126 may be a publicly accessible network of linked networks, possibly operated by various distinct parties, such as the Internet. In some embodiments, the spoken language processing system 100 may be located within the client device 110 and communicate via an internal communication network. The network 126 may include a private network, personal area network ("PAN"), LAN, WAN, cable network, satellite network, etc. or some combination thereof, each with access to and/or from the Internet.

The spoken language processing system 100 can be any computing system that is configured to communicate via a communication network. For example, the spoken language processing system 100 may include any number of server computing devices, desktop computing devices, mainframe computers, and the like. In some embodiments, the spoken language processing system 100 can include several devices physically or logically grouped together, such as an application server computing device configured to perform speech processing on an utterance and a database server computing device configured to store records and speech processing models.

The spoken language processing system 100 can include an automatic speech recognition (ASR) module 102, a natural language understanding (NLU) module 104, and an output generator 106. In some embodiments, the spoken language processing system 100 can include various modules and components combined on a single device, multiple instances of a single module or component, etc. For example, the spoken language processing system 100 may include a separate output generator 106 server; and a server or group of servers configured with ASR and NLU modules 102, 104. In multi-device implementations, the various devices of the spoken language processing system 100 may communicate via an internal communication network, such as a corporate or university network configured as a local area network ("LAN") or a wide area network ("WAN"). In some cases, the devices of the spoken language processing system 100 may communicate over an external network, such as the Internet, or a combination of internal and external networks.

In some embodiments, the features and services provided by the spoken language processing system 100 may be implemented as web services consumable via a communication network 126. In further embodiments, the spoken language processing system 100 is provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

The devices of the spoken language processing system 100 may be located within a single data center, and may communicate via a private or internal communication network as described above. A client device 110 may communicate with spoken language processing system 100 via the Internet. The client device 110 may have access to the Internet via a wired or WiFi connection, or via a cellular telephone network (e.g., a Long Term Evolution or LTE network).

In some embodiments, a spoken language processing system 100 may include fewer or additional modules than those shown in FIG. 1. For example, a spoken language processing system 100 may interact with applications 114 or services that are hosted by or otherwise associated with systems separate from the spoken language processing system 100. For example, a separate network-accessible system may provide one or more applications 114, the client device 110 may include one or more applications 114 as shown in FIG. 1, etc. In other embodiments, the applications or services 114 may be included in the spoken language processing system 100. In some embodiments, the spoken language processing system 100 may include integrated output filter models 122, 124. In other embodiments, the output filter models 122, 124 may be logically or physically separate (e.g., in a different memory space or on a different computing device) from the output generator 106 or the spoken language processing system 100. In some embodiments, the system 100 may contain more than one output generator 106.

In some embodiments, some or all of the features or components of the spoken language processing system 100 may be provided on the client device 110. For example, the client device 110 may include an output generator 106 and speech processing and synthesis functionality. Such a client device 110 may therefore engage in conversations with the user 120 without exchanging information with a remote spoken language processing system 100.

The spoken language processing system 100 may receive a device-directed user utterance. The ASR module 102 can receive and process the audio input of the user utterance, performing speech processing on the input and generating results (e.g., one or more likely transcripts of the user utterance). The ASR results from ASR module 102 may also be provided to the NLU module 104. The NLU module 104 can determine a semantic meaning from the recognized speech and contextual information in order to determine the user's intent.

The NLU module 104 may provide its results to the output generator 106. The output generator 106 may generate a response to the user's first utterance. The output generator 106 may generate an output corresponding to the response. The output may be any type of media output, such as an audio response, text response, video response, video and audio response, video and text response, etc. The output generator 106 may use a global output filter model 124 to determine whether the response is appropriate, and modify the output before delivering to the user 120 if it is not. For example, the output generator 106 may determine that the response contains offensive content. The output filter model 122, 124 can include a list of words that trigger modification of the output. The output filter model 122, 124 can include, for example, a list of profane words. In another example, the output filter model can include a list of profane words along with a profanity score for each word. For example, the response may include the word "shit." The global output filter model 124 may determine that hearing or seeing this word would be offensive to most users. The global output filter model 124 may then filter the word from the output corresponding to the response. The output generator 106 may focus on the offensiveness of the name of the content item in the response. For example, the output generator 106 can determine that the song title "Fuck You" contains offensive content. The output generator 106 can modify the portion of the response corresponding to the name of the content item if the name of the content item is offensive.

The output generator 106 may also use a user-specific output filter model 122 to determine whether the response is appropriate. For example, the response may include the words "bollocks" or "shag." Such words may be mildly offensive to British users. However, such words and/or phrases would not be offensive to most American users. An output filter model 122 geared towards American users would not filter such words from the output provided to the user 120, while an output filter model geared towards British users may filter such words. The spoken language processing system 100 can determine whether to use a user-specific output filter model 122 based on information about the user 120, user preferences, or prior user interactions. A user-specific output filter model 122 may be based on other identified user characteristics, such as the identity of the user 120, age, gender, sex, cultural background, language, religion, etc. In some embodiments, the user-specific output filter model 122 may be based on a specific user 120, such as the owner of a given client device 110. The spoken language processing system 100 may generate an audio output corresponding to the first response using the first response and text-to-speech synthesis.

The user 120 may provide additional user input to the client device 110. For example, the output generator 106 and the output filtering models 122, 124 may have determined that the user 120 likely requested a rap song containing profanity. The client device 110 may ask the user 120, "Did you mean '99 Problems' by Jay-Z?" The user 120 may answer affirmatively, and the client device 110 may play the response. In another example, the client device 110 may state, "Now playing '99 Problems.'" If the user 120 responds negatively, e.g., saying "Don't play that," turning off the music, turning off the client device 110, etc., the spoken language processing system 100 may determine that the user 120 is offended by such content. The output filter models 122 and 124 may optionally be further trained as a user 120 provides additional user input to the client device 110.

Generating Modified Outputs Corresponding to Responses

Figure 2:
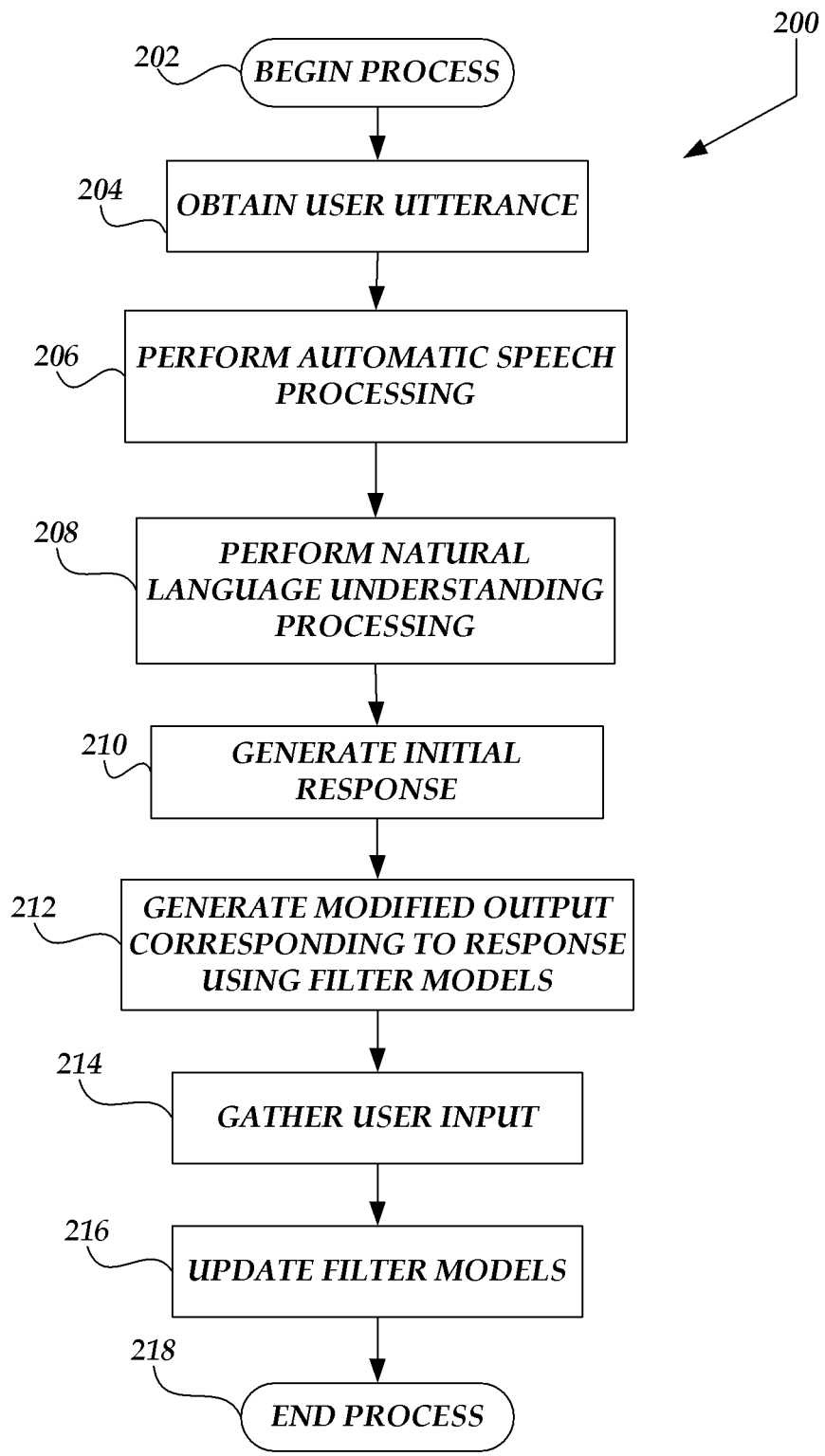
FIG. 2 is a flow diagram for an illustrative process for modifying a response to a user utterance.

FIG. 2 depicts a flow diagram of an illustrative process 200 for modifying content in an output corresponding to a response. The process 200 begins at block 202. The process 200 may be embodied in a set of executable program instructions stored on a computer-readable medium, such as one or more disk drives, of a computing device. When the process 200 is initiated, the executable program instructions may be loaded into the memory of a computing device and may be executed by one or more processors in communication with the computing device.

At block 204, the computing device executing the process 200 determines that it has received a user utterance directed at the client device 110. The client device may contain a detection system 112. The detection system 112 may continuously monitor the surrounding environment to determine whether a user 120 has directed an utterance toward the client device 110. The detection system 112 may additionally determine whether other users are in proximity of the device. For example, the detection system 112 can determine that other younger users are currently in the same room as the user 120 who is directing an utterance toward the client device 110. In some embodiments, the detection system 112 may communicate with the spoken language processing system 100 via a communication network 126. In some embodiments, the detection system 112 may be part of the spoken language processing system 100 and communicate via an internal communication network. The spoken language processing system 100 may be located within the client device 110.

While monitoring the surrounding environment, the detection system 112 may detect a user utterance directed at the client device 110. As discussed in additional detail above, the utterance may be prefaced by an activation word, such as "phone." In some embodiments, the utterance may not be prefaced by an activation word. In the utterance, "Play 'Fly Me to the Moon,'" the user 120 may expect the client device 110 to respond to the user utterance even though the user 120 did not preface the query with a wake word.

At block 206, the computing device performs automatic speech processing on the utterance. The spoken language processing system 100 may identify the utterance and process the utterance. The spoken language processing system 100 may process the audio input to generate one or more likely transcriptions of the user utterance. The transcriptions may be based on the acoustic features and lexical features of the language in which the utterance is spoken.

At block 208, the computing device may perform natural language processing and generate natural language understanding results. In some embodiments, the natural language understanding results may be ranked by event likelihood or some other correlate of correctness. For example, if the user 120 said, "Add 'macaroni and cheese' to my grocery shopping list," the natural language understanding results may identify that "macaroni and cheese" is more likely to be a correct result than the similar sounding phrase "the weather please" as the user 120 is making such a request in the context of adding an item to the user's grocery shopping list, not asking about the weather for a given location.

The computing device may generate an initial response to the user utterance using the output generator 106 at block 210. The response may include a user interface element. The user interface element can contain the name of a content item. The output generator 106 can generate an output corresponding to the response. The user interface element in the output may be an audio response, media response, textual response, etc. For example, the output generator 106 may generate an output stating to the user, "Now playing 'Fly Me to the Moon.'" The response can also or additionally include executing media content. For example, the output generator 106 can generate a command such that the client device 110 plays the song "Fly Me to the Moon."

The computing device may utilize filter output models 122, 124 to assess the level of offensiveness of an initial response at block 212. The computing device may detect offensive content due to graphic language, sexual content, violence, etc. For example, the computing device may detect a profanity in a word, phrase, or sentence generated by the output generator 106. The computing device may use these output filter models 122, 124 to grade the generated responses and select among different alternatives for the output. The output generator 106 may generate the modified output corresponding to the response using the output filter models 122, 124. The name of the content item can be modified before generating the first output. A portion of the output corresponding to the name of the content item can be modified. Controlling the offensive content can include filtering, modifying, generating entirely new content, etc. The generated responses may be scored using numerous different methods. In some embodiments, the scoring may be rule-based, with offensiveness levels assigned by experts. When dealing with a response that includes a command for the client device 110 to play one or more movies, for example, the movies may be rated G, PG, PG-13, R, and NC-17 following the ratings assigned by the Motion Picture Association of America. In some embodiments, classifiers may be assigned using labels from human annotations. These labels can be acquired through numerous methods. For example, the labels can be acquired using crowd-sourcing. In a more specific example, the crowd-sourcing may be used in conjunction with or instead of computers. Human intelligence can analyze the data and identify the data with labels. In another example, classifiers may be assigned using responses from surveys. In yet example, the offensiveness level can be derived from sources such as consumer reviews that have been flagged by other users as inappropriate.

The scoring may vary depending on the user 120. Words or phrases offensive in one culture but not another, or offensive to younger children but not older children, may be categorized depending on these variables. These variables may include age, race, sex, cultural background, language, religion, etc. For example, as mentioned above, the words "bloody," "bollocks," "shag," and "slag" may be mildly offensive to British users. However, such words and/or phrases would not be offensive to most American users. An output filter model 122 geared towards American users would not filter such words from the response, while an output filter model 122 geared towards British users may filter such words. In another example, a younger child may be offended by overly sexual content, while such content may be appropriate for an adult user.

A given user 120 may be assigned some threshold for content. The threshold can be a tolerance threshold. The tolerance threshold may correspond to the offensive content a user can be presented with without being offended. If the content exceeds that threshold, the content may be controlled by the computing device so as to avoid offending the user. The detection system 112 may have determined that other users 120 are in proximity to the system. The computing device can modify content based on the user 120 with the lowest threshold. For example, the computing device may determine that a young child is in the same room as the adult user 120, and that the potential response, while not offensive to the adult 120, may be offensive to the child. The computing device may modify the output corresponding to the response such that it is not offensive to the child. However, the adult user 120 may override this modification if desired.

The modified output may be delivered to the user 120 in response to the user utterance. The output may be delivered using a client device 110. The client device 110 may deliver the output corresponding to the response in a variety of different formats. For example, the output may include a movie, music, audio book, text, audio, etc. The response may utilize one or more applications 114. For example, if the user 120 asks for "cheese" to be added to a shopping list, the client device 110 may add "cheese" to the shopping list application 114 while stating to the user 120, "'Cheese' has been added to your shopping list."

The user 120 can deliver some input to the client device 110 following the delivery of the output. In some embodiments, the user 120 may provide the client device 110 with user input based on the generated response. The user input may be verbal, physical, etc. The user 120 may indicate, for example, that the user 120 wishes to hear some content that may potentially be offensive. In another example, the user 120 may indicate that the provided output is somehow offensive, e.g., by telling the client device 110 not to play the content or by shutting the client device 110 off. The user 120 may not provide any input to the client device 110. The client device 110 may identify that the user is not offended by the delivery of the output.

At block 216, the output filter models 122, 124 may be updated if needed. This step can be an optional step. The filter models 122, 124 may be updated to reflect the user input given at block 214. For example, the filter models 122, 124 may be updated to indicate that while a user 120 is not offended by a song containing profanity, the user 120 may not want the client device 110 to announce the title of the song if the title contains profanity. The output filter models 122, 124 may be further updated to reflect the preferences of the user 120. Such updating can improve the user experience and reduce the likelihood that the user 120 is offended by some generated response.

The process ends at block 218.

Figure 3:
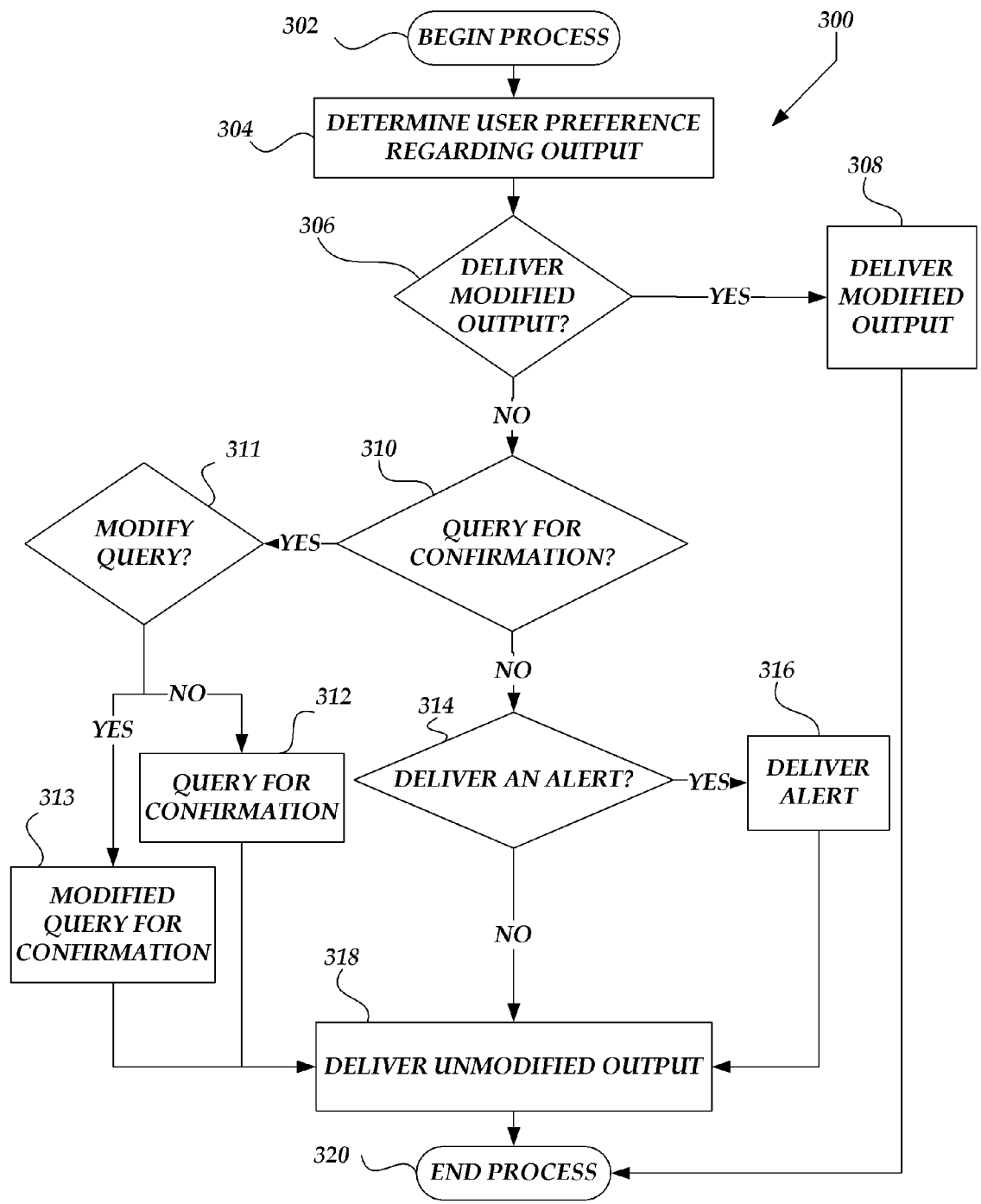
FIG. 3 is a flow diagram of an illustrative process for selecting from various output formats based on user thresholds and/or preferences.

Determining Potential Output Formats Based on User Thresholds and/or Preferences FIG. 3 is a flow diagram of an illustrative process 300 for selecting from various presentations of content based on user thresholds and/or preferences. The content can be offensive. These output formats may be classified from most restrictive to least restrictive. These example formats should not be viewed as limiting the format of potential outputs available to the output generator 106 depending on the user threshold. The threshold can correspond to a tolerance threshold. The output formats can, for example, be prompts delivered to the user 120 such as, "Did you want to hear this song?" or "Now playing 'Fly Me to the Moon.'" The higher the threshold of a user 120, the less restrictive the format may be. The output generator 106 may generate an output corresponding to the generated response, and deliver the output with the most suitable format to the client device 110. The client device 110 may then deliver the formatted output to the user 120. The process 300 begins at block 302. The process 300 may be embodied in a set of executable program instructions stored on a computer-readable medium, such as one or more disk drives, of a computing device. When the process 300 is initiated, the executable program instructions may be loaded into the memory of a computing device and may be executed by one or more processors in communication with the computing device.

At block 304, the computing device executing the process 300 determines the user preference regarding formatting the output. Filter models 122, 124 may be used to help determine the preference of a user 120. For example, the user 120 may provide the client device 110 with user input based on a previously presented output. The user input may include, e.g., shutting off the client device 110, telling the client device 110 not to play the content, not providing the client device 110 with any indication that the user 120 finds the content is offensive, etc.

At decision block 306, the computing device executing the process 300 may determine whether the user 120 desires some controlled output as part of the response. Controlled output can include, for example, filtering offensive content, modifying the output, and other means of controlling offensive content. For illustrative purposes, this will be described using modified output. If the user 120 desires some modified output, the computing device delivers modified output to the user 120 at block 308. The output may be modified in various manners. In some embodiments, the output may include a modified user interface element. The user interface element can correspond to the name of a content item. For example, the client device 110 may deliver an output corresponding to a response to the user 120 saying, "Now playing 'F*ck You' by Cee Lo Green." The output may include modified media content. For example, the client device 110 may play a censored version of the media content, such as the radio-safe version of the above song, "Forget You." The filtered output may include not delivering the requested content to the user 120. For example, the user 120 may be a seven-year-old requesting that the client device 110 play a "South Park" episode. The computing device may determine that such content exceeds the threshold of the user 120 and, as part of the response, direct the client device 110 to refuse to play the requested content. Such a refusal may be overridden by a user 120 if the user 120 desires. For example, a parent may determine that such content would not be offensive to the child, and may request that the client device 110 play the content. The client device 110 may then play the requested content.

The computing device may alternatively determine that it should deliver a different output format to the user 120. The computing device can use filter models 122, 124 to determine, however, that the output format is appropriate for the user 120. At decision block 310, the computing device can determine whether the user 120 would prefer to be asked for confirmation before being provided with potentially offensive content, such as an offensive movie or song. At decision block 311, the computing device can determine whether the user 120 would prefer to be asked for confirmation using a modified query before being provided with potentially offensive content. For example, the computing device may generate a prompt corresponding to a response stating, "Did you want to hear 'F*** You' by Cee Lo Green?" If the user 120 would prefer a modified query such as this, the modified query may be delivered to the user 120 at block 313. If the user 120 would not be offended by an unmodified query, the computing device can query the user 120 for confirmation at block 312 using an unmodified query such as, "Did you want to hear 'Fuck You' by Cee Lo Green?" If the user confirms that this is the correct output, the computing device can deliver the unmodified output to the user 120 at block 318. For example, the computing device may ask the user 120, "Did you want to watch the movie 'Bull Durham?'" Confirmation of this query indicates that the generated output corresponds to the correct response to the user utterance. The client device 110 may not begin playing the movie 'Bull Durham' until it receives confirmation from the user 120 that the user 120 wishes to watch that movie. In another example, the computing device may ask the user 120, "Did you want to hear '99 Problems' by Jay-Z?" Once the user 120 confirms that he wishes to listen to that song, the client device 110 may deliver the potentially offensive content at block 318.

At decision block 314, the computing device may determine whether the user 120 would prefer to be alerted of a potentially offensive output, such as an offensive movie or song. The output may contain offensive content that exceeds the tolerance threshold of the user 120 and is likely to offend the user 120 considering the context. For example, the output may include a movie rated R for offensive language, graphic violence, and nudity. The computing device may determine that the user 120 would prefer to be given a prompt alerting the user to the offensive content before the offensive content is delivered. At block 316, the computing device may deliver an alert to the user 120 before delivering the unfiltered output. For example, the client device 110 may inform the user 120 that the movie is rated R for offensive language, graphic violence, and nudity. After delivering the warning, the client device 110 may then begin playing the unfiltered output at block 318, e.g., start playing the R-rated movie, without waiting for confirmation from the user 120. The user 120 may turn off the device 110 or stop the unfiltered output from playing if the user 120 determines that the media content is offensive.

The computing device may determine with use of filter models 122, 124 that the user 120 is not likely to be offended by the response even though the output corresponding to the response may contain offensive content. For example, the user 120 may have said to the client device 110, "Add chicken breasts to my grocery shopping list." While the word "breasts" may be offensive to some users, the context in which it is used, e.g., adding chicken breasts to a grocery list, makes it highly unlikely that the output is an incorrect result that could offend the user 120. As such, the computing device may deliver unmodified output to the user 120 without any modifications even though the output would normally exceed the threshold of the user 120. In another example, the user 120 may frequently listen to profanity-laden rap music. Though such content may be offensive to other users, the computing device may determine that the user 120 is unlikely to be offended by unmodified output and may command the client device 110 to deliver the unmodified output to the user 120 at block 318.

The process ends at block 320.

Modifying Content in a Response

Figure 4:
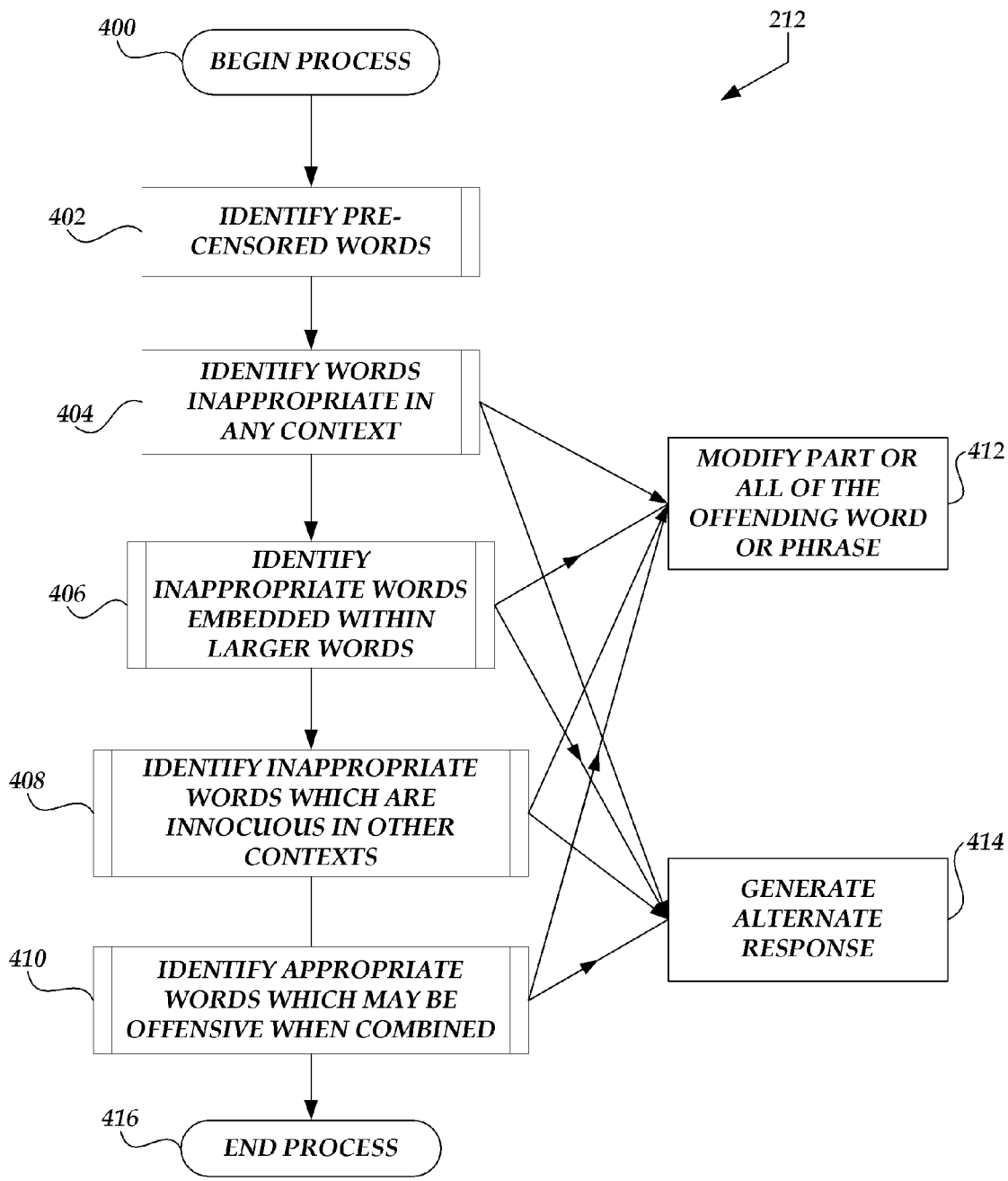
FIG. 4 is a flow diagram for an illustrative process for modifying offensive content in a response.

FIG. 4 depicts a flow diagram of an illustrative process 212 for modifying content from a response. The content can be offensive. The response can contain a user interface element. The user interface element can be a prompt. The user interface element can include the name of a content item. The process 212 may be a subprocess occurring at block 212 of the process 200 shown in FIG. 2. The process 212 begins at block 400. The process 212 may be embodied in a set of executable program instructions stored on a computer-readable medium, such as one or more disk drives, of a computing device. When the process 212 is initiated, the executable program instructions may be loaded into the memory of a computing device and may be executed by one or more processors in communication with the computing device.

The computing device may identify words that are pre-censored at block 402. This may include songs with pre-censored expletives. For example, the user interface element may include the song title "Fkin' Perfect" by Pink, or the title "Work B*h" by Britney Spears. These words may also be a high priority for the computing device to identify. However, after identifying these words, the computing device may not make any modifications to these words. The computing device may not replace the missing letters or words with the actual letters, as the computing device would be modifying appropriate content and turning it into potentially offensive content, e.g., the output corresponding to the response should not present the user 120 with, "Now playing "Work Bitch" by Britney Spears," when the initially generated response stated, "Now playing 'Work B***h' by Britney Spears."

To begin modifying the response, the computing device may identify words which are inappropriate in any context at block 404. These may be stand-alone words in all common forms. For example, the user interface element could include the song "Bullshit" by Adam Ant, or the album "Motherfucker" by The Revolution. Words that are inappropriate in any context may be a high priority for the computing device to identify, as most users may be offended by these words.

At block 406, the computing device may identify inappropriate words embedded within longer words or phrases. The song title may include concatenated words, where not all the subwords are expletives. For example, the song title may be "Shitlist" by L7. Identification of such words may not be as high of a priority for the computing device as these inappropriate words may not be inappropriate when the longer word or phrase is considered. For example, the computing device may identify the word "shat." However, the word "shat" may be part of the longer, non-offensive word "cross-hatch."

At block 408, the computing device may identify inappropriate words that may be innocuous in other contexts, or may be allowed in similar situations, e.g., on the television, radio, etc. For example, the word "breast" may be appropriate in the context of a grocery shopping list, e.g., may be referring to "chicken breast." However, the word "breast" may not be appropriate in a song title. Again, identification of such words or phrases may not be as high of a priority for the computing device as these words may not be inappropriate given the context.

At block 410, the computing device may identify appropriate words that may be inappropriate or offensive when combined. For example, the word "block" and the word "head" may both be appropriate words. Neither word would offend a user when used in a response by itself. However, the word "blockhead," which combines the two words, may be offensive to a sensitive user. Again, identification of such words or phrases may not be as high of a priority for the computing device as such words are generally appropriate.

The computing device has numerous options for modifying the offensive content once identified in blocks 404, 406, 408, and 410. At block 412, the computing device can modify part or all of the offending word or phrase. The computing device may elect to substitute a more appropriate word or phrase for the offensive content in the response. The computing device can modify the part of the response corresponding to the name of the content item. For example, "shit" may be replaced with "shoot," or the song title "Fuck You" by Cee Lo Green may become the song title "Forget You" by Cee Lo Green. The computing device can replace the offending content in the response when generating an output corresponding to the response. If the output includes some audio data, the computing device may replace part or all of the offensive content in the output corresponding to the response with an alternate sound. The alternate sound may be a different phonetic sound, e.g., "shit" may have part of the word replaced with the "oo" sound in "shoot." The alternate sound may be a buzzer, beep, ping, etc. layered over the offensive word. For example, the song title "Fuck You" may become the song title "Beep (audible) You." The computing device may alternatively mute part or all of the offending word or phrase in the output corresponding to the generated response.

At block 414, the computing device can instead generate an alternate response. In some embodiments, the computing device may avoid a response containing offensive content altogether. For example, instead of generating an output corresponding to the response that includes a user interface component stating, "Playing 'Fuck You'" by Cee Lo Green," the modified output corresponding to the response may now state, "Playing the requested song by Cee Lo Green." Such modification may involve generating an entirely new response and a new output corresponding to the response.

The computing device may select from the various options presented in blocks 410, 412, and 414 in order to modify the response if needed. A modified output corresponding to the response may then be generated. The modified output may then be delivered to the user 120. The modified output may be delivered using a client device 110. The client device 110 may deliver the output in a variety of different formats. For example, the output may include a movie, music, audio book, textual response, audio response, etc. The output may utilize one or more applications 114. For example, if the user 120 asks for "cheese" to be added to a shopping list, the client device 110 may add "cheese" to the shopping list application 114 while stating to the user 120, "'Cheese' has been added to your shopping list." The computing device may be programmed to over-compensate for specific inappropriate words versus utilizing overly complicated logic to understand whether the user 120 expected to hear offensive content.

The process ends at block 416.

TERMINOLOGY

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:
1. A system comprising:
  a computer-readable memory storing executable instructions; and
  one or more processors in communication with the computer-readable memory, wherein the one or more processors are programmed by the executable instructions to at least:
    obtain first audio input data regarding a first user utterance of a user;
    obtain a characteristic of the user;
    perform speech processing on the first audio input data to generate first speech processing results, the speech processing results including contextual information indicating a context to which the first utterance relates;
    determine a first response to the first user utterance using the first speech processing results, wherein the first response comprises a name of a content item;
    generate a profanity score for the name using an output filter model, the name, and the contextual information, the output filter model adapted to provide an output profanity score based upon an input word and a context in which the input word is used;
    identify a sensitivity threshold for users having the characteristic, the sensitivity threshold indicating an acceptable degree of offensiveness for users having the characteristic;
    determine the profanity score for the name exceeds the sensitivity threshold;
    generate first output audio data using the first response and text-to-speech synthesis, wherein (i) a portion of the first output audio data corresponding to the name of the content item is modified or (ii) the name of the content item is modified before generating the first output audio data; and transmit the first audio output to a user device.

2. The system of claim 1, wherein the output filter model is a user-specific output filter model determined using one or more of information about the user, user preferences, or prior user interactions.

3. The system of claim 1, wherein the characteristic of the user is one or more of an identity of the user, age, gender, sex, language, culture, or religion.

4. The system of claim 1, wherein the processor is further configured to:

generate the output filter mode using training data;
obtain second audio input data regarding a second user utterance, wherein the second user utterance is based in part on the first response; and
cause retraining of the output filter model based on the second audio input data regarding the second user utterance.

5. A computer-implemented method comprising:

under control of one or more computing devices configured with specific computer-executable instructions,
obtaining first input data regarding a first user utterance by a user;
obtaining a characteristic of the user;
performing speech processing on the first audio data to generate first speech processing results, the first speech processing results including contextual information indicating a context to which the first utterance relates;
determining a first response using the first speech processing results, wherein the first response comprises a name of a content item;
generating a profanity score for the name using an output filter model, the name, and the contextual information;
identifying a sensitivity threshold for users having the characteristic;
determining the profanity score for the name exceeds the sensitivity threshold;
generating a first output using the first response, wherein (i) a portion of the first output corresponding to the name of the content item is modified or (ii) the name of the content item is modified before generating the first output; and
transmitting the first output to a client device.

6. The computer-implemented method of claim 5, wherein the first user utterance is obtained in response to detecting a keyword in the first input data.

7. The computer-implemented method of claim 5, wherein determining the profanity score comprises determining that the name of the content item comprises one or more of graphic language, violence, or sexual content.

8. The computer-implemented method of claim 5, wherein the output filter model comprises a list of words that trigger modification of an output.

9. The computer-implemented method of claim 5, wherein the output filter model is a user-specific output filter model determined using one or more of information about the user, user preferences, or prior user interactions.

10. The computer-implemented method of claim 5, wherein the characteristic of the user is one or more of an identity of the user, age, gender, sex, language, culture, or religion.

11. The computer-implemented method of claim 5, wherein modifying the name of the content item comprises replacing at least a portion of the name of the content item with another word or phrase.

12. The computer-implemented method of claim 5, wherein the sensitivity threshold is based on a lowest sensitivity threshold from one or more users in proximity of the client device.

13. The computer-implemented method of claim 5, wherein the first output comprises one or more of text or audio data.

14. The computer-implemented method of claim 5, wherein the method further comprises:

generating the output model using training data;
obtaining second input data regarding a user action, wherein the user action is based in part on the first output; and
cause retraining the output filter model based on the second input data regarding the user action.

15. One or more non-transitory computer readable media comprising executable code that, when executed, cause one or more computing devices to perform a process comprising:

obtaining first input data regarding a first user utterance;
performing speech processing on the first input data to generate first speech processing results, the first speech processing results including contextual information indicating a context to which the first utterance relates;
determining a first response to the first user utterance using the first speech processing results, wherein the first response comprises a name of a content item;
generating a profanity score for the name using an output filter model, the name, and the contextual information;
identifying a sensitivity threshold using the first input data;
determining the profanity score for the name exceeds the sensitivity threshold; and
generating a first output using the first response, wherein (i) a portion of the first output corresponding to the name of the content item is modified or (ii) the name of the content item is modified before generating the first output.

16. The one or more non-transitory computer readable media of claim 15, wherein determining the profanity score comprises determining that the name of the content item comprises one or more of graphic language, violence, or sexual content.

17. The one or more non-transitory computer readable media of claim 15, wherein the output filter model comprises a list of words that trigger modification of an output.

18. The one or more non-transitory computer readable media of claim 15, wherein the output filter model is a user-specific output filter model determined using one or more of information about the user, user preferences, or prior user interactions.

19. The one or more non-transitory computer readable media of claim 15, wherein the process further comprises obtaining a characteristic for one or more users in proximity to a user device providing the first utterance, wherein identifying the sensitivity threshold is further based on the characteristic.

20. The one or more non-transitory computer readable media of claim 15, wherein modifying the first output involves replacing at least a portion of the first output with a non-offensive word or phrase.

21. The one or more non-transitory computer readable media of claim 15, wherein the sensitivity threshold is based on a lowest sensitivity threshold from one or more users in proximity to a user device providing the first utterance.

22. The one or more non-transitory computer readable media of claim 15, wherein the generated first output comprises one or more of text or audio data.

23. The one or more non-transitory computer readable media of claim 15, wherein the process further comprises:
   generating the output model using training data;
   obtaining second input data regarding a user action, wherein the user action is based in part on the first output; and
   cause retraining the output filter model based on second input data regarding the user action.

* * * * *